United States Patent [19]

Cavin et al.

[11] Patent Number: 4,816,102

[45] Date of Patent: Mar. 28, 1989

[54] METHOD AND APPARATUS FOR FORMING AN ELONGATED COMPOSITE PART

[75] Inventors: Michael G. Cavin; Robert N. Binford, both of Federal Way; Kenneth Halphide, Bellevue, all of Wash.

[73] Assignee: The Boeing Company, Seattle, Wash.

[21] Appl. No.: 133,014

[22] Filed: Dec. 15, 1987

[51] Int. Cl.$^4$ .............................................. B32B 31/20
[52] U.S. Cl. ................................... 156/222; 156/180; 156/289; 156/323; 156/441; 264/174; 264/284; 425/112; 425/505
[58] Field of Search ................ 156/180, 222, 289, 323, 156/441; 264/174, 280, 284; 425/112, 114, 505

[56] References Cited

U.S. PATENT DOCUMENTS

| | | |
|---|---|---|
| 3,200,023 | 8/1965 | Cilker . |
| 3,399,094 | 8/1968 | Skoggard et al. . |
| 3,756,004 | 9/1973 | Gore . |
| 3,793,108 | 2/1974 | Goldsworthy ...................... 156/180 |
| 3,806,394 | 4/1974 | Davis . |
| 3,887,761 | 6/1975 | Gore . |
| 4,038,018 | 7/1977 | Pepmeier ............................ 425/505 |
| 4,154,634 | 5/1979 | Shobert et al. ...................... 156/180 |
| 4,307,053 | 12/1981 | Daws et al. ...................... 425/505 X |
| 4,388,127 | 6/1983 | Brunner et al. . |
| 4,515,737 | 5/1985 | Karino et al. . |
| 4,581,263 | 4/1986 | Lukas . |
| 4,624,726 | 11/1986 | Harper .............................. 156/323 |

Primary Examiner—Robert A. Dawson
Attorney, Agent, or Firm—Seed and Berry

[57] ABSTRACT

A method and an apparatus for forming elongated composite parts having constant cross sections. The apparatus comprises a form having a cross section, a portion of which is complementary to a first portion of the desired cross section of the elongated part. The apparatus further comprises a holding means having a cross section, a portion of which is complementary to a second portion of the desired cross section of the elongated part. Plies of preimpregnated composite material are held within a slip tape, which, in turn, is forced against the complementary cross section of the form by the holding means. The apparatus is then passed lengthwise along the slip tape enclosing the preimpregnated plies of composite material to cause the slip tape to tighten around the preimregnated plies and to generate a slip tape-enclosed, elongated part which is appropriately shaped to pass through a pultrusion die.

20 Claims, 3 Drawing Sheets

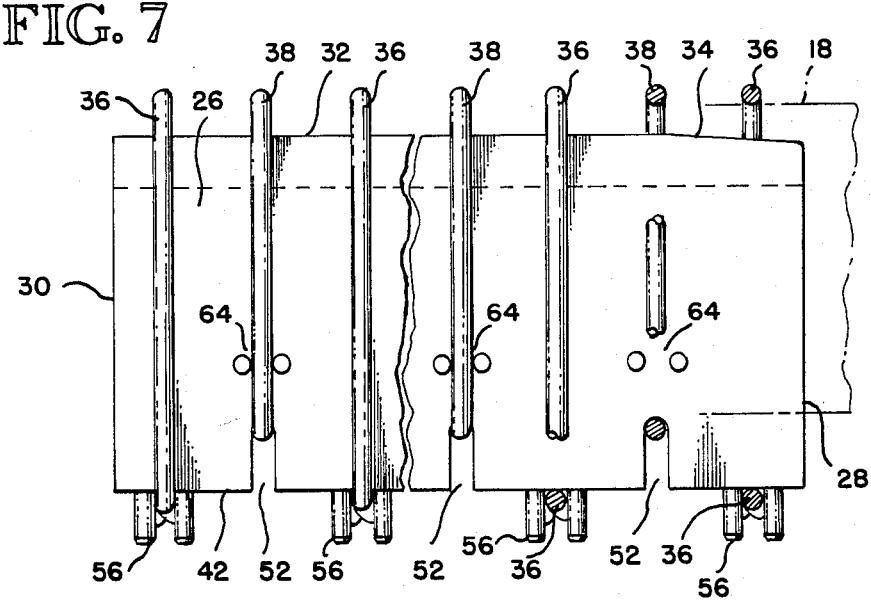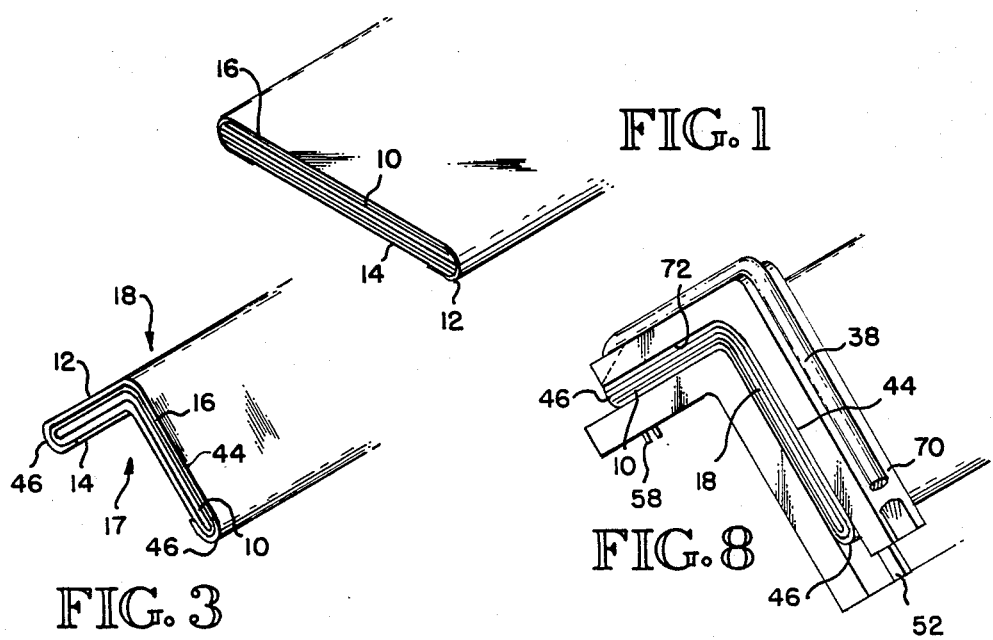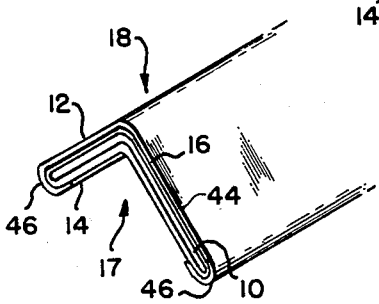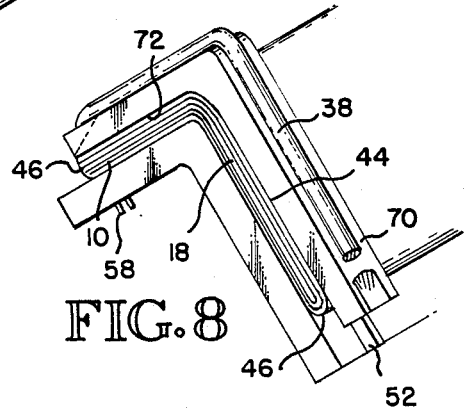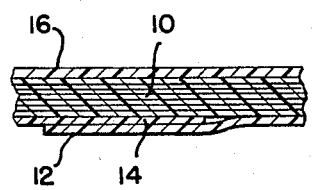

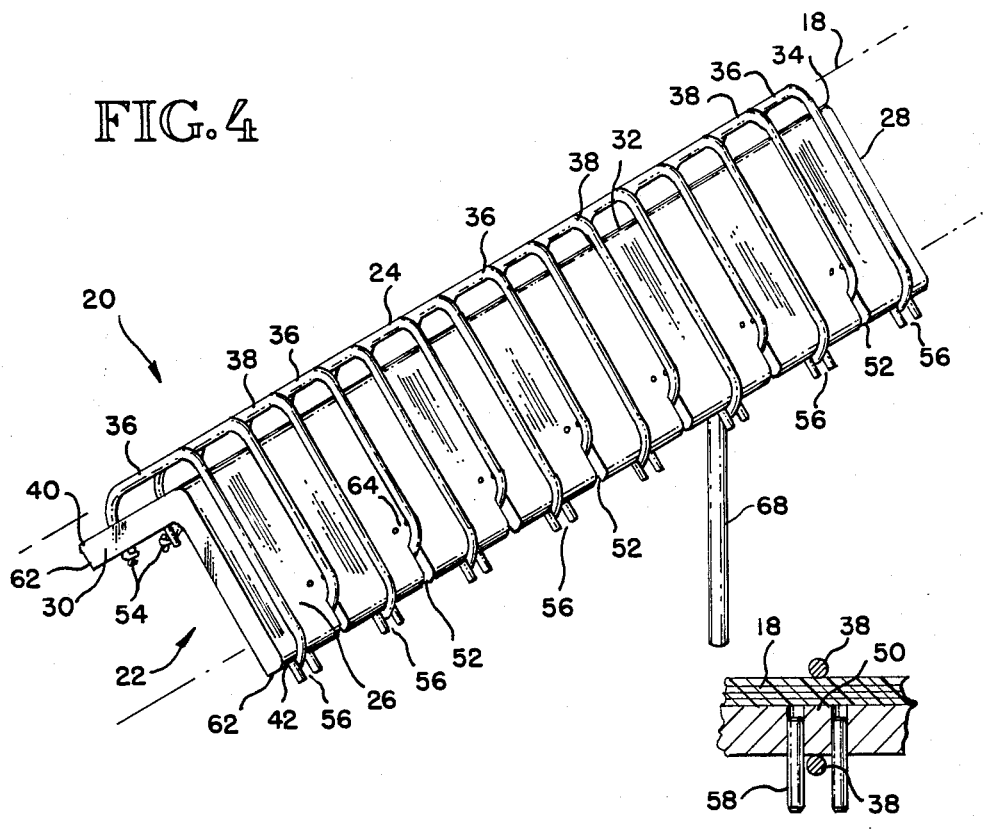
FIG. 4
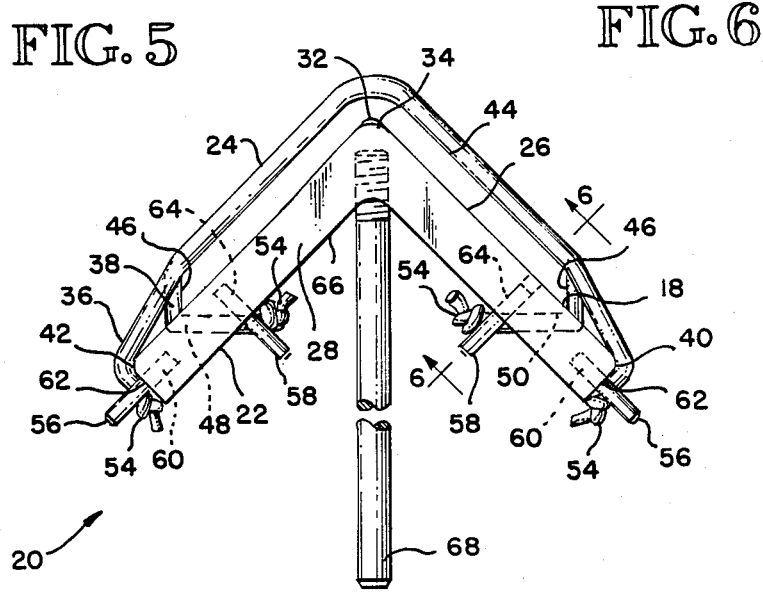
FIG. 5
FIG. 6

METHOD AND APPARATUS FOR FORMING AN ELONGATED COMPOSITE PART

STATEMENT OF GOVERNMENT INTEREST

The Government has certain rights in this invention.

TECHNICAL FIELD

This invention relates to forming an elongated composite material part, and more particularly, to a method and an apparatus for forming an elongated composite material part having a predetermined cross section.

BACKGROUND ART

Pultrusion formation of elongated composite material parts is well known to the art. In essence, pultrusion forms parts by pulling uncured laminations of plies of a matrix material (such as graphite fiber cloth) preimpregnated with an adhesive (such as a thermosetting epoxy) through a die having a desired cross section and hardening the resulting elongated composite material part by curing the adhesive. In order to retain the preimpregnated adhesive within the composite material matrix before the adhesive is cured, the preimpregnated plies are enclosed in one or more slip tapes. The slip tape, along with the preimpregnated composite material plies, is pulled through the pultrusion die, which includes a heated punch, and then into an autoclave, wherein the uncured epoxy is hardened. After the epoxy is cured, the slip tape (which does not adhere to the cured epoxy of the part), can be easily removed.

Prior to the development of the present invention, the tools used to wrap the preimpregnated composite material plies with the slip tape provided, at best, a loose fit of the slip tape on the laminations. The loose fit required the additional use of end stops in the slip tape to aid in containing the liquid epoxy along the slip tape edges during the pultrusion process. The loose fit also made the slip tape and preimpregnated plies difficult to pull through the pultrusion die.

It is therefore desirable to provide a tool and method for tightening the wrap of a slip tape around preimpregnated plies of composite material and preforming the wrapped preimpregnated plies into the shape of the desired elongated part.

DISCLOSURE OF THE INVENTION

The present invention provides a method and an apparatus for tightening the wrap of a slip tape around a plurality of plies of uncured, preimpregnated composite material and for preforming the enclosed preimpregnated plies to the desired shape.

It is an object of the present invention to provide a method and an apparatus for progressively tightening a slip tape around a plurality of preimpregnated plies of composite material.

It is another object of the present invention to provide a method and an apparatus for preforming a plurality of preimpregnated composite plies enclosed in a slip tape into a desired cross-sectional shape.

It is a further object of the present invention to provide a method and an apparatus for tightening a slip tape around a plurality of plies of preimpregnated composite material in order to contain the liquid epoxy within the preimpregnated plies.

In one aspect, the present invention provides a tool for tightening a slip tape around a preformed, elongated, composite material part blank, the elongated part having a predetermined desired cross section defined by a perimeter including at least two portions. The tool comprises a form adapted to receive a relatively short section of a length of a slip tape enclosing preimpregnated plies of uncured composite material and to travel along the length of the slip tape. The form has a leading edge and a trailing edge, the edges defining the direction of travel of the form along the length of the slip tape from the leading edge to the trailing edge. A portion of the perimeter of the cross section of the form is complementary to a first of the portions of the perimeter of the elongated composite part. The tool further comprises holding means attachable to the form for forcing the preimpregnated plies of uncured composite material in the elongated slip tape against the perimeter portion of the form to form the first portion of the perimeter of the elongated composite part and for forming a second portion of the perimeter of the elongated part.

In another aspect, the method of the present invention comprises the steps of placing a relatively short portion of the length of a slip tape enclosing preimpregnated plies or uncured composite material in a form having a portion of its cross section complementary to the cross section of the desired elongated composite part, attaching a holding means to the form for forcing the preimpregnated plies of uncured composite material in the elongated slip tape against the perimeter portion of the form to form the first portion of the perimeter of the elongated composite part and for forming a second portion of the perimeter of the elongated part, and causing the form and the holding means to travel the length of the preimpregnated plies of uncured composite material and the slip tape, thereby tightening the slip tape around the preimpregnated plies.

BRIEF DESCRIPTION OF THE DRAWINGS

FIG. 1 is an isometric view of preimpregnated plies of composite material enclosed in a slip tape.

FIG. 2 is a closeup cross-sectional view of a portion of FIG. 1.

FIG. 3 is an isometric drawing showing the preimpregnated plies of composite material in the slip tape of FIG. 1 after the plies and slip tape have been formed in the desired shape.

FIG. 4 is an isometric view of one embodiment of the apparatus of the present invention.

FIG. 5 is an edge-on view of the wrapper tool shown in FIG. 4.

FIG. 6 is a cross-sectional view of a portion of the apparatus shown in FIG. 4.

FIG. 7 is a view, in partial cross section, of one face of the tool shown in FIG. 4.

FIG. 8 is an isometric view of a second embodiment of the apparatus of the invention in partial cross section.

BEST MODE FOR CARRYING OUT THE INVENTION

Figure 10:
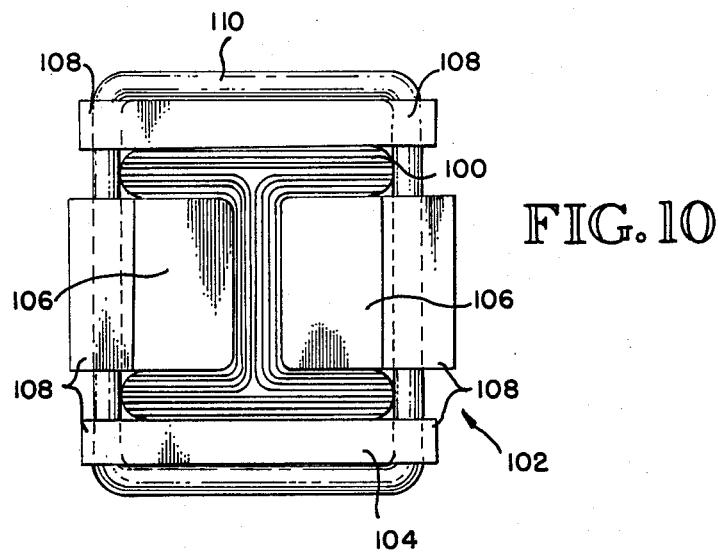
FIG. 10 is an edge-on view of a fourth embodiment of the apparatus of the present invention.

FIG. 1 is an isometric view of a part blank consisting of a plurality of preimpregnated plies 10 of uncured composite material enclosed in a slip tape 12. The plie can be, for example, several lengths of graphite fabric and can be preimpregnated with uncured epoxy. The transverse width of each ply is typically up to six inches, but can be virtually any dimension. The slip tape 12 can be made from any suitable material, such as a nylon fabric having a Teflon ® coating. The slip tape 12 can completely enclose the preimpregnated plies 10 with one or more lengths. In the typical application shown in FIG. 1, slip tape 12 comprises two lengths of Teflon ®-coated nylon fabric. A first length 14 covers substantially the entire width of the bottom surface of preimpregnated plies 10. The second length 16 covers the entire upper surface of preimpregnated plies 10 and overlaps the two edges of the first length 14 on the bottom surface of the preimpregnated plies 10. The details of the overlapping first and second lengths of slip tape can be seen in the closeup cross-sectional view of FIG. 2.

The part blank can be formed to the desired final cross section and wrapped tightly in its slip tape by the method and apparatus of the present invention. A portion of the desired cross section of the elongated part is created by a form (or other forming means) of the apparatus, while the remainder of the cross section is generated by a coacting resilient holding means of the apparatus. Assuming that the part that is to be formed in L-shaped, FIG. 3 shows the shape of the slip tape-wrapped, preimpregnated plies 10 after they have been folded lengthwise to produce a part having the desired cross section.

A first embodiment of the apparatus of the present invention is shown in FIG. 4. Tool 20 consists of a form 22 and a holding means 24. Tool 20 tightens the wrap of the slip tape around the part blank and forms the L-shaped elongated part blank 18 of FIG. 3 (also shown in phantom lines in FIGS. 4, 5, and 7). The concave portion 17 of part blank 18 is placed against the upper surface 26 of form 22. The holding means 24 is resiliently biased against the upper surface of part blank 18 to force the part blank 18 to conform to the shape of the form 22. Holding means 24 also causes slip tape 12 to wrap more tightly around preimpregnated plies 10, as explained in greater detail below.

Aluminum has been found to be a convenient material for making form 22, and it can be formed by bending a plate lengthwise and thereby creating rounded ridge 32. Rounded ridge 32 extends between a leading edge 28 and a trailing edge 30, and separates the two planar portions of upper surface 26. Rounded ridge 32 is slightly tapered adjacent leading edge 28 of form 22 in order to facilitate the shaping of part blank 18 by upper surface 26. Tapered ridge 34 can, for example, taper at an angle of about three degrees with respect to the remainder of the rounded ridge 32. To further facilitate the easy slippage of part blank 18 on tool 20, sections of slip tape fabric can be attached to upper surface 26 by an adhesive.

Holding means 24 can comprise a plurality of separate resilient transverse holding components 36 and 38. Holding components 36 and 38 can be made from, for example, covered elastic straps, such as conventional shock cords. FIGS. 1, 2 and 4 show holding components 36 and 38 being spaced away from form 22 by the thickness of the part blank 18 (indicated in dashed lines). In operation, the part blank is moved along the form 22 from the leading edge 28 to the trailing edge 30. The transverse force produced by holding components 38 and 36 against part blank 18 increases as part blank 18 moves along the tool 20. The increasing tension of the holding components 36 and 38 along the length of the form 22 causes the slip tape 12 to "crawl" and tighten against plies 10 to the required dimensions of part blank 18 before part blank 18 is introduced into the pultrusion die. The tension of the holding components 36, stretching between rounded edges 40 and 42 of side edge 62, thus tighten the slip tape 12 on the part blank 18 and force the part blank 18 to conform to the shape of the form 22. Side edges 62 connect leading and trailing edges 28 and 30 and run substantially parallel to the direction of travel of tool 20. In addition, side edges 62 are located transversely outward from part blank 18. In this way, form 22 further supports uncured part blank 18 until it has been formed by tool 20 and then cured.

Holding components 38 also help to define upper perimeter 44 of the cross section of part blank 18, but, more importantly, define edges 46 of part bank 18. Holding components 38 stretch between rounded edges 48 and 50 of a pair of transversely opposing notches 52, which are formed in side edges 62 of form 22. A holding component 38 must be longer than an adjacent holding component 36 in order to provide the same tensioning force against L-shaped elongated part blank 18. This is because, even though the distance around upper perimeter 44 of L-shaped part blank 18 is shorter between rounded edges 48 and 50 than it is between rounded edges 40 and 42, holding components 38 attach to side edges 62 while holding components 36 attach to the undersurface 66 of form 22. The attachment of holding components 36 and 38 is described subsequently in this application.

The force that is provided by an individual holding component 36 or 38 is determined by the relative change in length of the holding component between its relaxed length and its installed length. The ends of holding components 36 and 38 are defined by knots 54 that engage against pin pairs 56 and 58. Pin pairs 56, placed in holes 60 along side edges 62, define the stretched length of holding components 36. Pin pairs 58, on the other hand, which fit into holes 64 along undersurface 66 of form 22, define the stretched length of holding components 38. The distance between corresponding pin pairs 56 around upper perimeter 44 of part blank 18 is constant, independent of the position of the pin pairs 56 along form 22. Therefore, holding components 36 can provide increasing tension by making them with shorter relaxed lengths the further they are from leading edge 28 and toward trailing edge 30. Similarly, the holding components 38 having shorter relaxed lengths are placed closer to trailing edge 30.

If desired, alternating holding components 36 and 38 can be formed from a single length of shock cord (for example connecting the two adjacent knots 54 shown in FIG. 4). The length can have a series of knots spaced appropriately to define the required changing lengths of the alternating holding components 36 and 38. It may be particularly convenient to attach the knots placed adjacent to pin pairs 56 and 58 along one side of form 22 by an adhesive, such as a small dab of silicone adhesive.

To produce an L-shaped elongated composite part having three-inch legs with a tool that is fifteen inches long, it has been found convenient for holding components 36 and 38 to have relaxed lengths in accordance with the following table:

| Position | (Ref. No.) | Relaxed Length (inches) |
|---|---|---|
| 1 | 36 | 6.85 |
| 2 | 38 | 7.75 |
| 3 | 36 | 6.50 |

-continued

| Position | (Ref. No.) | Relaxed Length (inches) |
| --- | --- | --- |
| 4 | 38 | 7.33 |
| 5 | 36 | 6.14 |
| 6 | 38 | 6.92 |
| 7 | 36 | 5.78 |
| 8 | 38 | 6.50 |
| 9 | 36 | 5.42 |
| 10 | 38 | 6.08 |
| 11 | 36 | 5.07 |
| 12 | 38 | 5.67 |
| 13 | 36 | 4.71 |
| 14 | 38 | 5.25 |
| 15 | 36 | 4.35 |

In this table, position numbers increase from leading edge 28 to trailing edge 30. The positions are spaced one inch apart.

While it is designed primarily to be held in a fixed position with respect to a pultrusion die, the tool 20 can also be adapted for hand use by attaching a handle 68 to the undersurface 66 of form 22. Handle 68 can be attached to form 22 through matching threads formed on the end of handle 68 and in the body of form 22.

The above-described tool 20 produces L-shaped elongated parts 18 having legs whose lengths are retained within a tolerance of ten one-thousandths of an inch and whose angularity is controlled to one-tenth of a degree. In addition, leg thickness can be controlled to three one-thousandths of an inch. In some cases, it may be desirable to further control the uniformity of the legs of an L-shaped part blank 18. This can be accomplished by means of cinch plates 70, as shown in the isometric view of FIG. 8. The undersurface 72 of cinch plate 70 can be made extremely smooth in order to very accurately control the thickness of part blank 18. Typically, undersurface 72 very closely parallels upper surface 26 of form 22. Cinch plate 70 is held in place by a holding component 38, such as knotted shock cord. The knots defining the relaxed length of holding component 38 are caught behind a pin pair 58 and it passes through notch 52 and over cinch plate 70 to a corresponding pin pair 58.

The steps required to produce an L-shaped elongated part blank 18 with the apparatus described above are: first, to place a relatively short portion of the length of slip tape 12 in the form 22. The next step is to attach holding means 24 to the form 22 for forcing the preimpregnated plies 10 of uncured composite material against the perimeter portion of the form 22 to force the part blank 18 to have the desired cross section. The last step is to cause the form 22 and the holding means 24 to travel the length of the predetermined plies 10 and the slip tape 12. This tightens the slip tape 12 around the shape of the preimpregnated plies 10.

Figure 9:
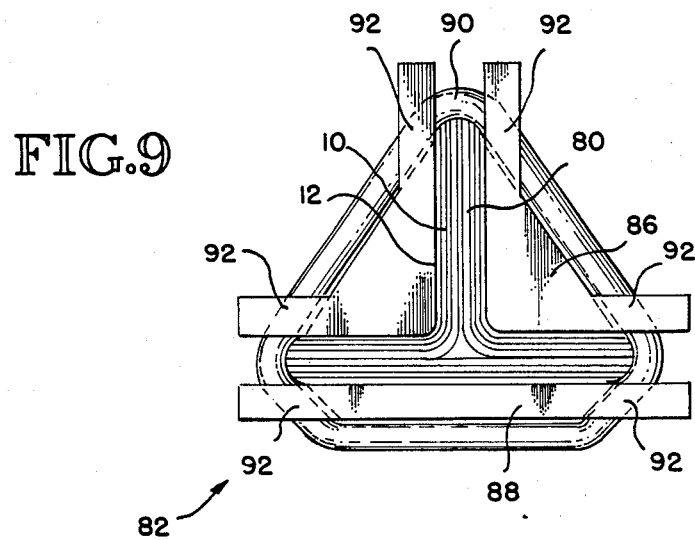
FIG. 9 is an edge-on view of a third embodiment of the apparatus of the present invention.

The above-described method and apparatus can be be generalized by those skilled in the art to produce elongated parts whose cross sections are more complicated than L-shaped. As shown in the cross-sectional view of a wrapper tool in FIG. 9, a T-shaped elongated part blank 80 can be placed in a form 82 comprising pieces 84-88. The part blank 80 can be formed from preimpregnated plies 10 of a composite material, and fully enclosed in a slip tape 12. Pieces 84 through 88 have internal cross sections, portions of which are complementary to portions of the desired cross section of part blank 80. Force is simultaneously applied to parts 84-88 by holding means 90. Holding means 90 can, for example, be one or more lengths of shock cord. Parts 84-88 can be retained in lengthwise alignment by means of notches 92 which are formed in parts 84-88. The part blank 80 passes through the wrapper tool from a leading edge to a trailing edge. In order ot facilitate the smooth formation of the T-shaped part from part blank 80, the leading edges of the forming means 82-84 can be tapered in a manner similar to the tapered ridge portion 34 of rounded ridge 32 in form 22 of FIGS. 4, 5 and 7. If further desired, the force applied by forming means 82 against part blank 80 can be increased in the direction of travel by decreasing the length of the respective holding means 90 in the direction of travel.

A third embodiment of the tool of the present invention is shown in the cross-sectional view of FIG. 10. In this case, the tool receives an I-shaped elongated part blank 100. Form 102 comprises end plates 104 to define the upper and lower crossbars of the part blank 100, and further comprises forms 106, which define the connecting web between the end pieces of the part blank 100. End plates 104 and forms 106 contain notches 108, which help to retain end plates 104 and forms 106 in correct lengthwise alignment. As disclosed above in connection with FIG. 9, the leading edges of end plates 104 and forms 106 can be tapered in order to facilitate the formation of the I-shaped part. In addition, if it is desirable to impose an increasing transverse force on part blank 100 in the direction of travel, the lengths of holding means 110 can be caused to decrease in the direction of travel.

While the foregoing has described the method and preferred embodiments of the apparatus of the present invention, one skilled in the art will appreciate that a variety of modifications can be made to these embodiments without departing from the spirit and scope of the invention. Accordingly, the spirit and scope of the present invention are to be limited only by the following claims.

We claim:

1. A tool for tightening a slip tape around an elongated composite part blank, the desired cross section of the elongated part being defined by a perimeter including at least two portions, the tool comprising:
    a form adapted to receive a relatively short section of a length of a slip tape enclosing preimpregnated plies of uncured composite material, said form having a leading edge and a trailing edge, said edges defining the direction of travel of the length of the slip tape along the form from the leading edge to the trailing edge, a portion of the perimeter of the cross section of said form being complementary to a first of said portions of the perimeter of said elongated composite part; and
    holding means, attachable to the form for forcing the preimpregnated plies of uncured composite material in the slip tape against said perimeter portion of the form to form said first portion of the perimeter of the elongated composite part and for forming a second portion of the perimeter of the elongated part.

2. The tool of claim 1 wherein at least a portion of the leading edge of the form is tapered in the direction of travel.

3. The tool of claim 1, said form further comprising side edges that connect said leading and trailing edges, said side edges being substantially parallel to the direction of travel and extending transversely outward from the uncured part in order to support the uncured part.

4. The tool of claim 3 wherein the holding means comprises a plurality of transverse holding components and the form includes at least one pair of transversely opposing notches, one notch formed in each of the side edges, each pair of notches adapted to receive one transverse holding component.

5. The tool of claim 1 wherein said form includes a handle and an undersurface disposed oppositely from said portion of the perimeter of the cross section of the form, said handle being adapted to attach to said undersurface.

6. The tool of claim 1 wherein said form includes attachment means for attaching said holding means to said form.

7. The tool of claim 3 wherein said holding means comprises a plurality of transverse holding components and said form includes a plurality of transversely opposed attachment means, each of said plurality of attachment means adapted to attach one of said plurality of transverse holding components to said form.

8. The tool of claim 7 wherein the holding components are knotted segments of elastic strap and each of said attachment means includes means for engaging said knotted segments.

9. The tool of claim 8 wherein said means for engaging said knotted segments comprises a pair of closely spaced pins.

10. The tool of claim 8 wherein the knotted segments of elastic strap are formed on a single length of elastic strap.

11. The tool of claim 1 wherein said holding means comprises one or more cinch plates adapted to be forced against said second portion of the perimeter of the elongated part.

12. The tool of claim 11 wherein said holding means further comprises a plurality of transverse holding components, each of said cinch plates being adapted to receive at least one of said holding components.

13. A tool for tightening a slip tape around an elongated composite part blank, the desired cross section of the elongated part being defined by a perimeter including at least two portions, the tool comprising:
  a form adapted to receive a relatively short section of a length of a slip tape enclosing preimpregnated plies of uncured composite material, said form having a leading edge and a trailing edge, said edges defining the direction of travel of the length of the slip tape along the form from the leading edge to the trailing edge, a portion of the perimeter of the cross section of said form being complementary to a first of said portions of the perimeter of said elongated composite part; and
  holding means, comprising a plurality of transverse holding components and attachable to the form for forcing the preimpregnated plies of uncured composite material in the slip tape against said perimeter portion of the form to form said first portion of the perimeter of the elongated composite part and for forming a second portion of the perimeter of the elongated part, each of the plurality of transverse holding components producing a greater transverse force against said preimpregnated plies as a function of the direction of travel.

14. The tool of claim 13, said form further comprising side edges that connect said leading and trailing edges, said side edges being substantially parallel to the direction of travel and extending transversely outward from the uncured part in order to support the uncured part.

15. The tool of claim 13 wherein said form includes a plurality of transversely opposed attachment means, each of said plurality of attachment means adapted to attach one of said plurality of transverse holding components to said form.

16. The tool of claim 13 wherein said holding means comprises one or more cinch plates adapted to be forced against said second portion of the perimeter of the elongated path.

17. The tool of claim 13 wherein said holding menas further comprises a plurality of transverse holding components, each of said cinch plates being adapted to receive at least one of said holding components.

18. The method of tightening an elongated slip tape around a plurality of uncured, preimpregnated, composite material plies and forming the wrapped plurality of preimpregnated, composite material plies to a shape having a desired cross section defined by a perimeter including at least two portions, comprising the steps of:
  (a) placing a relatively short section of the length of said slip tape in a form that has a portion of its cross section complementary to said desired cross section;
  (b) attaching a holding means to said form for forcing said preimpregnated plies of uncured composite material and said slip tape against said perimeter portion of said form to form said first portion of said perimeter of the elongated composite part and for forming a second portion of said perimeter of said desired cross section; and
  (c) causing said form and said holding means to travel the length of said preimpregnated plies of uncured composite material and said slip tape,
  thereby tightening said slip tape on said preimpregnated plies which have the desired cross section of the elongated composite part.

19. The method of claim 18 wherein step (b) includes stretching at least one transverse holding component across the form to force said preimpregnated plies of uncured composite material and said slip tape against said perimeter portion of said form and to form said second portion of said perimeter of said desired cross section.

20. The method of claim 18 wherein step (b) includes placing one or more cinch plates against the plurality of preimpregnated plies of uncured composite material and said slip tape and stretching at least one transverse holding component across said one or more cinch plates against said preimpregnated plies of uncured composite material and said slip tape to form said second portion of said perimeter of said desired cross section.

* * * * *